US010062879B2

(12) United States Patent
Lee et al.

(10) Patent No.: US 10,062,879 B2
(45) Date of Patent: Aug. 28, 2018

(54) BATTERY MODULE ASSEMBLY OF IMPROVED RELIABILITY AND BATTERY PACK EMPLOYED WITH THE SAME

(71) Applicant: LG CHEM, LTD., Seoul (KR)

(72) Inventors: BumHyun Lee, Seoul (KR); JiYoung Choi, Yongin-si (KR); DalMo Kang, Daejeon (KR); JunYeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 911 days.

(21) Appl. No.: 14/243,631

(22) Filed: Apr. 2, 2014

(65) Prior Publication Data

US 2014/0212722 A1 Jul. 31, 2014

Related U.S. Application Data

(63) Continuation of application No. PCT/KR2012/010882, filed on Dec. 14, 2012.

(30) Foreign Application Priority Data

Dec. 14, 2011 (KR) .................. 10-2011-0134170

(51) Int. Cl.
*H01M 2/10* (2006.01)
*H01M 2/20* (2006.01)
(Continued)

(52) U.S. Cl.
CPC ....... *H01M 2/1077* (2013.01); *H01M 2/0267* (2013.01); *H01M 2/1016* (2013.01);
(Continued)

(58) Field of Classification Search
CPC ................... H01M 2/1016; H01M 2/1077
(Continued)

(56) References Cited

U.S. PATENT DOCUMENTS 6,224,995 B1 5/2001 Fauteux et al.
6,524,732 B1 2/2003 Iwaizono et al.
(Continued)

FOREIGN PATENT DOCUMENTS

CN 1925201 A 3/2007
CN 101395737 A 3/2009
(Continued)

OTHER PUBLICATIONS

Machine Translation of JP 2002-141036 originally published May 17, 2002 to Shukutani et al.*
(Continued)

*Primary Examiner* — Jonathan G Leong
(74) *Attorney, Agent, or Firm* — Birch, Stewart, Kolasch & Birch, LLP (57) ABSTRACT

A battery module assembly having one or more plate-shaped cells, including two or more battery modules having cell units, each of which includes one or more battery cells, electrically connected to one another, a pair of an upper and lower case to surround outer circumferences of the modules such that one surface of each of the outermost modules is exposed outside in a state in which the modules are erected on their sides, one or more first fastening holes vertically formed at a top of the upper case and a bottom of the lower case in a direction in which first fastening holes face each other to fasten and fix the upper and lower case, and two or more second fastening holes horizontally formed at a front and/or a rear of the upper case and a front and/or a rear of the lower case to position or fix the assembly.

19 Claims, 8 Drawing Sheets

(51) Int. Cl.
*H01M 2/02* (2006.01)
*B60L 11/18* (2006.01)

(52) U.S. Cl.
CPC ......... *H01M 2/1094* (2013.01); *H01M 2/206* (2013.01); *B60L 11/1879* (2013.01); *H01M 2/021* (2013.01); *H01M 2/0212* (2013.01); *H01M 2/0217* (2013.01); *H01M 2/0277* (2013.01); *H01M 2/0285* (2013.01); *H01M 2/0287* (2013.01); *H01M 2220/20* (2013.01); *Y02T 10/705* (2013.01)

(58) Field of Classification Search
USPC .............................................. 429/96, 99, 100
See application file for complete search history.

(56) References Cited

U.S. PATENT DOCUMENTS

| | | |
|---|---|---|
| 2004/0033416 A1 | 2/2004 | Kim et al. |
| 2004/0058233 A1 | 3/2004 | Hamada et al. |
| 2005/0031946 A1 | 2/2005 | Kruger et al. |
| 2005/0084748 A1* | 4/2005 | Miller ................. H01M 2/1077 429/99 |
| 2005/0260488 A1 | 11/2005 | Zhou et al. |
| 2005/0271952 A1 | 12/2005 | Jung |
| 2006/0214631 A1 | 9/2006 | Yoon et al. |
| 2006/0246773 A1* | 11/2006 | Yoon ................... H01M 2/1077 439/507 |
| 2009/0017366 A1 | 1/2009 | Wood et al. |
| 2009/0220853 A1 | 9/2009 | Yang et al. |
| 2009/0226806 A1 | 9/2009 | Kiya |
| 2009/0311581 A1 | 12/2009 | Park et al. |
| 2009/0325043 A1 | 12/2009 | Yoon et al. |
| 2010/0009251 A1 | 1/2010 | Shin et al. |
| 2010/0035142 A1* | 2/2010 | Ha ...................... H01M 2/0207 429/153 |
| 2010/0121965 A1 | 5/2010 | Chatterjee |
| 2010/0136420 A1 | 6/2010 | Shin et al. |
| 2011/0045335 A1 | 2/2011 | Lee et al. |
| 2011/0070474 A1* | 3/2011 | Lee ....................... B60L 3/0046 429/120 |
| 2011/0076531 A1 | 3/2011 | Lee et al. |
| 2011/0117394 A1 | 5/2011 | Hwang et al. |
| 2011/0129696 A1 | 6/2011 | Baek |
| 2011/0135994 A1 | 6/2011 | Yang et al. |
| 2011/0189515 A1 | 8/2011 | Yoon et al. |
| 2011/0244144 A1 | 10/2011 | Uchida |
| 2012/0015236 A1 | 1/2012 | Spare |
| 2012/0315522 A1 | 12/2012 | Shin et al. |
| 2013/0078457 A1 | 3/2013 | Saitoh et al. |
| 2013/0078487 A1 | 3/2013 | Shin et al. |

FOREIGN PATENT DOCUMENTS

| | | |
|---|---|---|
| CN | 101395740 A | 3/2009 |
| CN | 102208591 A | 10/2011 |
| EP | 1309018 A2 | 5/2003 |
| EP | 2 299 521 A2 | 3/2011 |
| JP | 2-177250 A | 7/1990 |
| JP | 2002141036 A * | 5/2002 |
| JP | 2003-7271 A | 1/2003 |
| JP | 2004-79434 A | 3/2004 |
| JP | 2004-111309 A | 4/2004 |
| JP | 2009/529216 A | 8/2009 |
| JP | 2009-529217 A | 8/2009 |
| JP | 2009-537944 A | 10/2009 |
| JP | 2010-519676 A | 6/2010 |
| KR | 10-2007-0112489 A | 11/2007 |
| KR | 10-2008-0027504 A | 3/2008 |
| KR | 10-2008-0027506 A | 3/2008 |
| KR | 10-2009-0010426 A | 1/2009 |
| KR | 10-2009-0052802 A | 5/2009 |
| KR | 10-2010-0109873 A | 10/2010 |
| KR | 10-2011-0066774 A | 6/2011 |
| KR | 10-2011-0112896 A | 10/2011 |
| KR | 10-2011-0112900 A | 10/2011 |
| WO | WO 02/32503 A1 | 4/2002 |
| WO | WO 2007/102670 A1 | 9/2007 |
| WO | WO 2010/114318 A2 | 10/2010 |
| WO | WO 2011/040297 A1 | 4/2011 |
| WO | WO 2011/152668 A2 | 12/2011 |

OTHER PUBLICATIONS

International Search Report, issued in PCT/KR2012/010882, dated Feb. 25, 2013.

* cited by examiner

BATTERY MODULE ASSEMBLY OF IMPROVED RELIABILITY AND BATTERY PACK EMPLOYED WITH THE SAME

CROSS REFERENCE TO RELATED APPLICATIONS

This application is a Bypass Continuation of PCT International Application No. PCT/KR2012/010882 filed on Dec. 14, 2012, which claims priority under 35 U.S.C § 119(a) to Patent Application No. 10-2011-0134170 filed in the Republic of Korea on Dec. 14, 2011, all of which are hereby expressly incorporated by reference into the present application.

TECHNICAL FIELD

The present invention relates to a battery module assembly with improved reliability and a middle or large-sized battery pack including the same and, more particularly, to a battery module assembly having one or more plate-shaped battery cells, including two or more battery modules having cell units, each of which includes one or more battery cells, electrically connected to one another, a pair of an upper case and a lower case to surround outer circumferences of the battery modules such that one surface of each of the outermost battery modules is exposed outside in a state in which the battery modules are erected on their sides, one or more first fastening holes vertically formed at a top of the upper case and a bottom of the lower case in a direction in which first fastening holes face each other to fasten and fix the upper case and the lower case, and two or more second fastening holes horizontally formed at a front and/or a rear of the upper case and a front and/or a rear of the lower case to position or fix the battery module assembly.

BACKGROUND ART

Recently, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery pack having a plurality of battery cells electrically connected to one another because high output and large capacity are necessary for the middle or large-sized devices.

Preferably, the middle or large-sized battery pack is manufactured so as to have as small a size and weight as possible. For this reason, a prismatic battery or a pouch-shaped battery, which can be stacked with high integration and has a small weight to capacity ratio, is usually used as a battery cell of the middle or large-sized battery pack. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for the middle or large-sized battery pack to provide output and capacity required by a specific apparatus or device, it is necessary for the middle or large-sized battery pack to be configured to have a structure in which a plurality of battery cells is electrically connected in series to each other or in series and parallel to each other and the battery cells are stable against external force.

Specifically, when the battery cells are connected in parallel to each other, electrode terminals of the respective battery cells are connected to each other by one to one welding at a single weld point.

When three or more battery cells are connected in parallel to one another while being stacked, however, three or more connections between the electrode terminals of the battery cells are needed with the result that the structure of the battery pack becomes complicated and internal resistance increases when the same region is welded.

Meanwhile, a conventional battery pack is generally manufactured by fixing battery modules to a base plate and using an end plate and a support bar for a portion of battery modules in order to secure dynamic stability.

However, the battery pack having the above structure has spatial limitations in mounting the battery modules therein. In a case in which a large number of battery modules are used to constitute the battery pack, the structural stability of the battery pack is lowered.

In addition, the conventional battery pack is configured to have a structure in which the battery modules are fixed to the base plate using bolts or nuts such that the battery modules cannot be moved upward and downward and the battery modules are fixed in the longitudinal direction using the end plate and the support bar in order to secure dynamic stability.

In the battery pack having the above structure, however, the battery modules are fixed to the base plate using fastening members, such as a plurality of bolts or nuts with the result that an assembly process is complicated and troublesome. In addition, it is necessary to secure a space for the fastening members, resulting in spatial limitations and weight limitations of the fastening members.

Therefore, there is a high necessity for a battery pack having a compact structure that is capable of solving the above problems.

DISCLOSURE

Technical Problem

Therefore, the present invention has been made to solve the above problems and other technical problems that have yet to be resolved.

Specifically, it is an object of the present invention to provide a battery module assembly, an assembly process of which is simplified and which is entirely compact and lightweight based on a novel fastening structure to fix battery modules.

It is another object of the present invention to provide a battery module assembly configured such that cell units are electrically connected to each other on a per two battery cell basis using bus bars, thereby improving welding reliability and minimizing internal resistance.

Technical Solution

In this specification, a battery module assembly, which will hereinafter be described, is configured to have a structure in which battery modules are arranged on any plane in a height direction such that the battery modules are adjacent to each other.

A battery cell constituting a battery module according to the present invention is a plate-shaped battery cell having electrode terminals formed at one end thereof. The battery cell is formed approximately in the shape of a rectangular parallelepiped. One surface at which the electrode terminals are formed is defined as a front and the other surface opposite to the front is defined as a rear. In addition, the largest two ones of the surfaces excluding the front and the rear are defined as a top and a bottom. The other two surfaces excluding the front, the rear, the top, and the bottom are defined as sides.

Consequently, an upper case and a lower case are assembled to surround opposite sides of the battery cell. Fronts and rears of the upper case and the lower case are defined as surfaces having the same directions as the front and rear of the battery cell.

In addition, a vertical direction, which is a direction in which a first fastening hole, which will hereinafter be described, is formed, means a direction parallel to an upright direction of the battery module and a horizontal direction, which is a direction in which a second fastening hole, which will hereinafter be described, is formed, means a direction parallel to a direction in which the battery modules are arranged.

In accordance with one aspect of the present invention, the above and other objects can be accomplished by the provision of a battery module assembly having one or more plate-shaped battery cells, including two or more battery modules having cell units, each of which includes one or more battery cells, electrically connected to one another, a pair of an upper case and a lower case to surround outer circumferences of the battery modules such that one surface of each of the outermost battery modules is exposed outside in a state in which the battery modules are erected on their sides, one or more first fastening holes vertically formed at a top of the upper case and a bottom of the lower case in a direction in which first fastening holes face each other to fasten and fix the upper case and the lower case, and two or more second fastening holes horizontally formed at a front and/or a rear of the upper case and a front and/or a rear of the lower case to position or fix the battery module assembly.

Specifically, one surface of each of the battery modules which is exposed outside is defined as a surface corresponding to a top or a bottom of each of the battery cells.

That is, in the battery module assembly according to the present invention, the battery modules can be coupled between the upper case and the lower case using a minimum number of members, thereby easily achieving assembly of a battery pack and thus optimizing the space of the battery pack and reducing weight of the battery pack. In particular, in a case in which the battery pack is assembled to have a shelf structure, such as a rack, it is easy to fix the battery pack, thereby securing overall structural stability of the battery pack.

In a concrete example, each of the first fastening holes or the second fastening holes is configured to have a structure in which a fastening thread is formed at an inner circumference of each of the first fastening holes or the second fastening holes. Consequently, it is possible to easily configure the battery pack to have a rack structure by easily inserting and fastening members, such as bolts, into the fastening holes.

In another concrete example, each of the second fastening holes may be configured to have a structure depressed from an outside of the upper case or the lower case. According to circumstances, each of the second fastening holes may be formed in an arc shape open toward an outside of the upper case or the lower case in vertical section.

Each of the second fastening holes having the above structure may be configured such that a corresponding fastening member to position or fix the battery module assembly is coupled to each of the second fastening holes.

Meanwhile, each of the battery modules may be configured to have a structure in which cell units, each of which includes two or more battery cells, are connected in parallel to one another.

In another concrete example, electrode terminals of the cell units may be electrically connected to each other via bus bars.

In a further concrete example, the battery module assembly may further include a bus bar assembly disposed at a front of the battery modules to electrically connect the battery modules to one another In this case, each of the cell units may include an even number of battery cells. That is, in a case in which the battery modules are connected in parallel to each other considering capacity of the battery modules, welding is simultaneously performed at the same region during welding between a plurality of electrode terminals or between the electrode terminals and bus bars, resulting in the increase in internal resistance at the welded region.

In the battery module assembly according to the present invention, on the other hand, the battery cells of the cell units are connected in parallel to each other on a per two battery cell basis, thereby improving welding reliability at the welded region. In addition, it is possible to easily achieve parallel connection based on the even number of battery cells.

Electrode terminals of the cell units may be electrically connected to each other via bus bars. Welding may be easily performed based on the cell units including the even number, e.g. two or more, of battery cells.

In a preferred example, the bus bar assembly may include (a) a cover plate formed of an electrically insulative material, the cover plate being fixed to the front of the battery modules, the cover plate including a pair of body parts and (b) a pair of body parts, each of which is configured to have a structure in which an external input and output terminal is formed at an L-shaped side thereof and two or more bus bars diverge from the other side thereof in plane in a state in which the body parts are mounted on the cover plate, and the body parts may be arranged so as to face each other in the direction horizontal to the direction in which the battery modules are arranged.

The body parts may be coupled to the cover plate, preferably, by insert injection molding.

In addition, the body parts may be provided with steps to prevent a short circuit between the external input and output terminals of the battery module assembly. Consequently, the positions of the external input and output terminals may be set based on the steps.

Each of the battery cells is a secondary battery having a small thickness and a relatively large width and length to minimize the overall size of the battery cells when the battery cells are stacked to constitute a battery module. In a preferred example, the secondary battery may be configured to have a structure in which an electrode assembly of a cathode/separator/anode structure is mounted in a battery case formed of a laminate sheet including a resin layer and a metal layer and a cathode terminal and an anode terminal protrude from opposite ends or one end of the battery case. Specifically, the secondary battery may be configured to have a structure in which an electrode assembly is mounted in a pouch-shaped case formed of an aluminum laminate sheet. The secondary battery having the structure as described above may also be referred to as a pouch-shaped battery cell.

In a preferred example, each of the cell units may be configured to have a structure in which the battery cells are mounted between metal housings in a state in which the battery cells are in tight contact with each other.

In the above structure, the metal housings may be coupled to each other to surround the entirety of an outside of a battery cell stack constituted by two or more battery cells excluding cathode and anode terminals of the battery cells. Consequently, the metal housings restrain the deformation of the battery cells due to repetitive expansion and contraction of the battery cells during charge and discharge of the battery cells, while protecting the battery cells, the mechanical strength of which is low, to prevent sealed portions of the battery cells from being separated from each other.

Specifically, each of the metal housings may have an internal structure corresponding to an outside shape of a battery cell stack and, in particular, the metal housings may be coupled to each other in an assembly fastening fashion. For example, the metal housings may be configured to have a male and female fastening structure in which section coupling parts of the metal housings are engaged with each other by elastic coupling when the metal housings are pushed toward each other in a state in which the metal housings are in contact with each other such that the metal housings face each other.

Meanwhile, heat is generated from a secondary battery during the charge and discharge of the secondary battery and effective discharge of the generated heat out of the secondary battery is very important in extending the life span of the secondary battery and securing the safety of the secondary battery. For this reason, each of the metal housings may be made of a metal sheet exhibiting high thermal conductivity, by which heat generated from the battery cells mounted between the metal housings is easily discharged outside.

According to circumstances, insulating tape may be attached to an outer circumference of each of the battery cells excluding the electrode terminals of each of the battery cells. Consequently, it is possible to prevent destruction of insulation resistance due to contact between the battery cells and other members, such as the metal housings.

In accordance with another aspect of the present invention, there is provided a battery pack including two or more battery module assemblies with the above-stated construction, wherein one or more second fastening holes, in which fastening members to fasten the battery module assemblies or to position or fix support members are coupled, are formed at a rear of an upper case or a rear of a lower case, the battery module assemblies are arranged in tight contact to constitute a battery module assembly stack, and the battery pack includes a first support member and a second support member disposed at opposite sides of the battery module assembly stack such that the first support member and the second support member are coupled to the fastening members to fix the battery module assembly stack.

When constituting the battery pack according to the present invention, therefore, the battery modules may be easily positioned and fixed, thereby securing overall structural stability.

In a concrete example, the battery pack may further include a third support member disposed at a bottom of the battery module assembly stack such that the third support member is coupled to the first support member and the second support member.

Specifically, the first support member, the second support member, and the third support member may be made of a plate-shaped metal sheet. The first support member, the second support member, and the third support member may include one or more beads having a concavo-convex structure to increase rigidity thereof.

Coupling between the support members is not particularly restricted so long as it is possible to prevent the battery modules from being separated from each other due to external vibration or external force. For example, coupling between the support members may be achieved by bolting, forced fitting, hook coupling, or welding.

In another concrete example, each of the fastening members may be formed in a prismatic, circular, or oval bar shape in vertical section in a longitudinal direction and each of the second fastening holes may be formed in a shape corresponding to an outer shape of each of the fastening members.

When constituting the battery pack, therefore, it is possible to easily fix the battery modules by mounting the bar-shaped members in the second fastening holes and, at the same time, to secure overall structural stability of the battery pack.

In accordance with a further aspect of the present invention, there is provided a device including the battery pack with the above-stated construction.

The device may be an electric vehicle, a hybrid electric vehicle, a plug-in hybrid electric vehicle, or a power storage device in consideration of installation efficiency and structural stability of the battery module assembly as described above. However, the present invention is not limited thereto.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
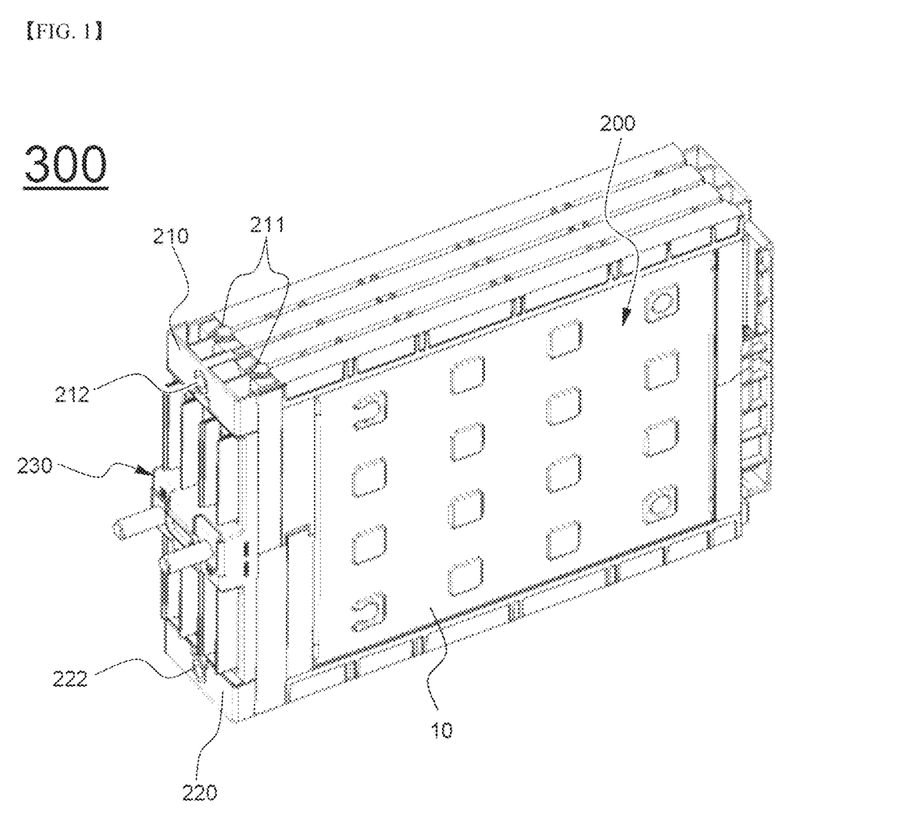
FIG. 1 is a perspective view showing a battery module assembly according to the present invention.
Figure 2:
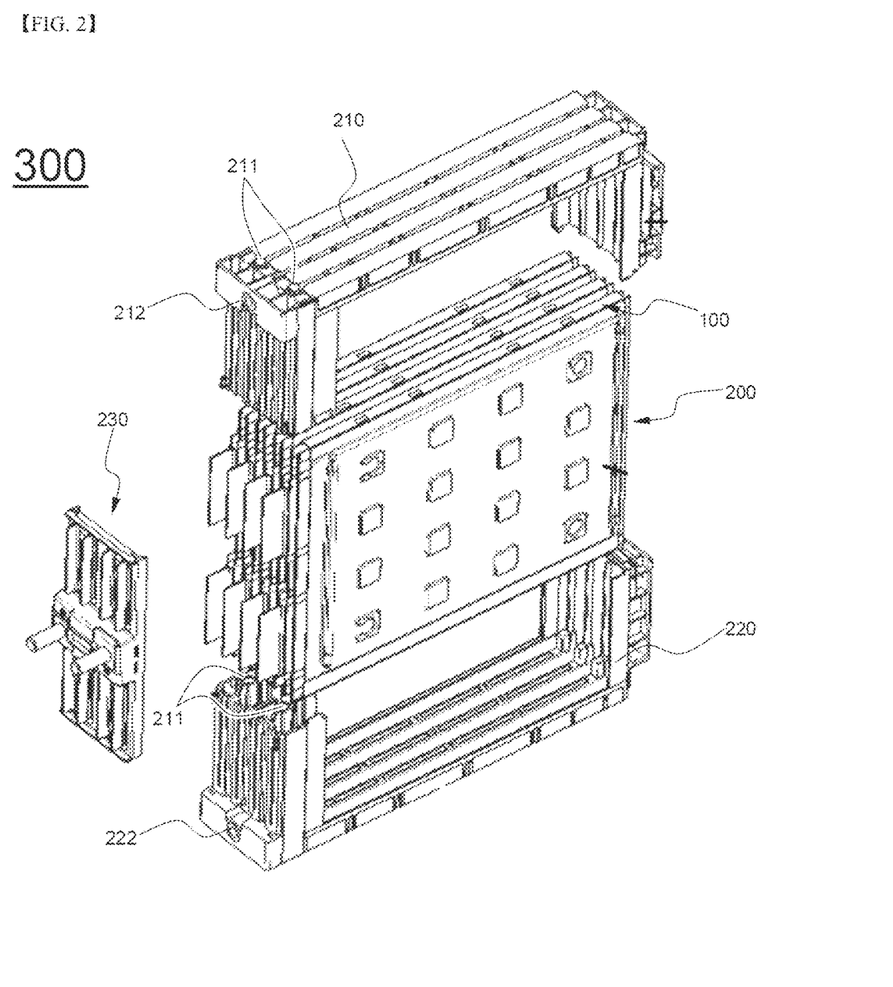
FIG. 2 is an exploded perspective view of the battery module assembly shown in FIG. 1.

FIG. 1 is a perspective view showing a battery module assembly according to the present invention and FIG. 2 is an exploded perspective view showing the battery module assembly shown in FIG. 1.

Referring to these drawings, the battery module assembly 300 includes four battery modules 200 having cell units 100, each of which includes two battery cells 10, connected in parallel to one another, a pair of an upper case 210 and a lower case 220 to surround the upper part and the lower part of the battery modules 200 in a state in which the battery modules 200 are erected on their sides, a bus bar assembly 230 disposed at the front of the battery modules 200 to electrically connect the battery modules 200 to one another in parallel, first fastening holes 211 formed at the top of the upper case 210 and the bottom of the lower case 220, and fastening holes 212 and 222 formed at the front of the upper case 210 and/or the front of the lower case 220.

Figure 3:
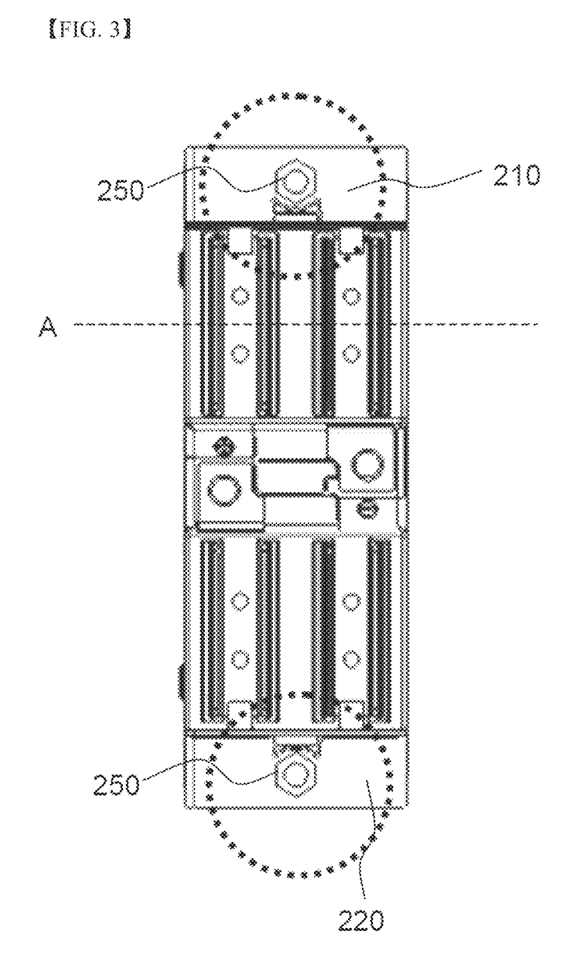
FIG. 3 is a front view of the battery module assembly shown in FIG. 1.
Figure 4:
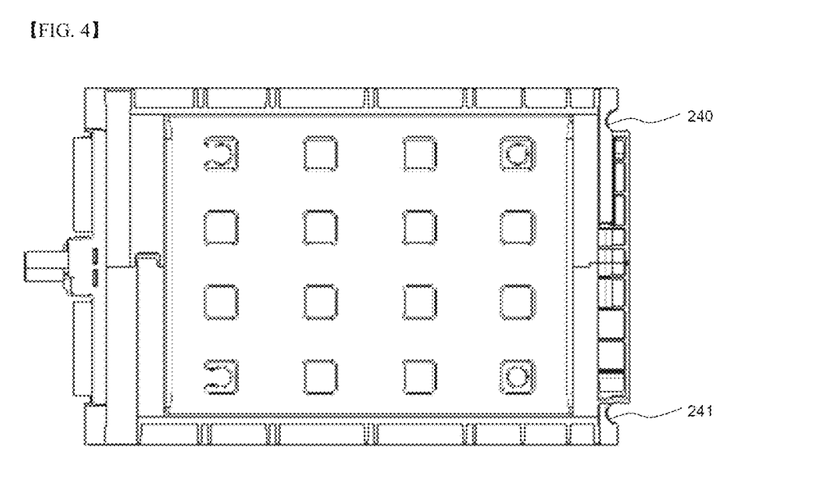
FIG. 4 is a side view of the battery module assembly shown in FIG. 1.

FIG. 3 is a front view showing the battery module assembly shown in FIG. 1 and FIG. 4 is a side view showing the battery module assembly shown in FIG. 1.

Referring to these drawings together with FIGS. 1 and 2, the fastening holes 211, 212, and 222 are configured to have a structure in which a fastening thread (not shown) is formed at the inner circumference of each of the fastening holes 211, 212, and 222. Consequently, it is possible to fasten the upper case 210 and the lower case 220 by inserting bolts 250 into the fastening holes 211, 212, and 222.

In addition, second fastening holes 240 and 241 are formed at the rear of the upper case 210 and the rear of the lower case 220 in a direction (direction A of FIG. 3) horizontal to a direction in which the battery modules 200 are arranged such that fastening members 440 (see FIG. 9) to position or fix the battery module assembly 300 can be coupled in the second fastening holes 240 and 241.

Figure 5:
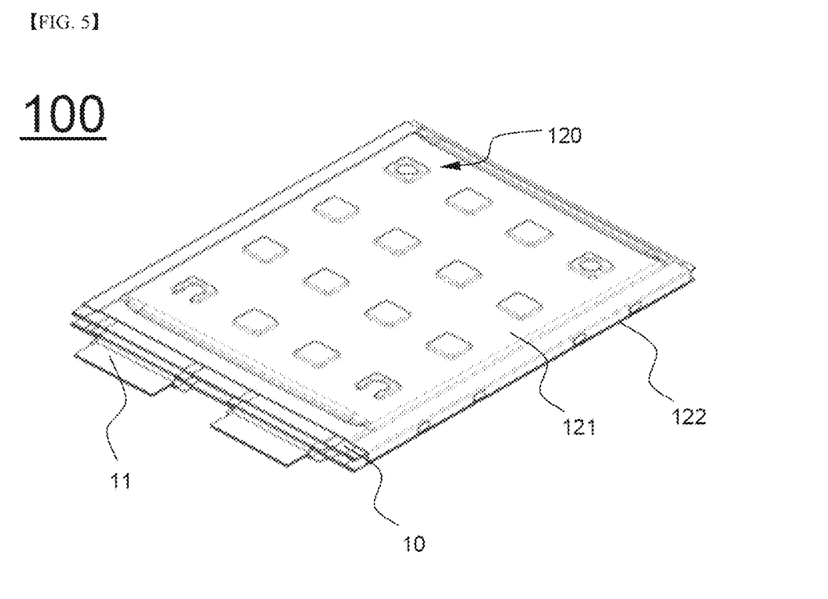
FIG. 5 is a perspective view of a cell unit.
Figure 6:
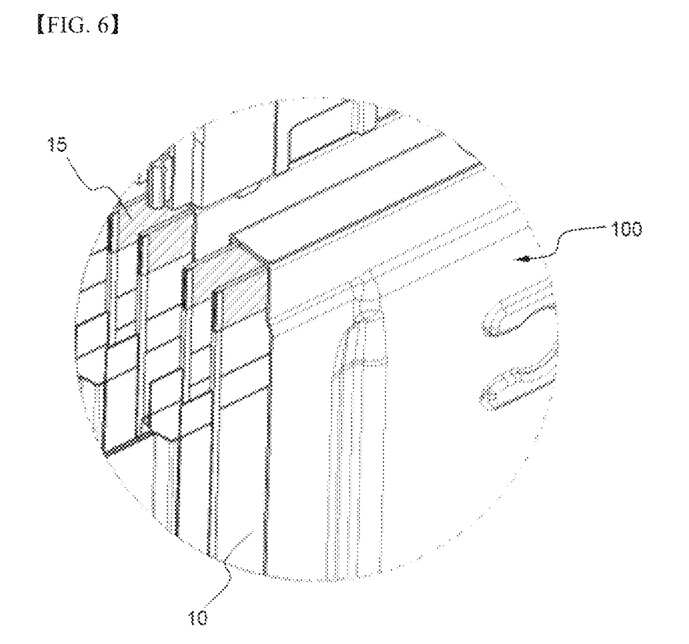
FIG. 6 is a partially enlarged view of a battery cell shown in FIG. 5.

FIG. 5 is a perspective view of a cell unit and FIG. 6 is a partially enlarged view showing a battery cell shown in FIG. 5.

Referring to these drawings, the cell unit 100 includes two battery cells 10. Insulating tape 15 is attached to the outer circumference of each battery cell 10 excluding electrode terminals 11 to prevent destruction of insulation resistance due to contact between the battery cell 10 and metal housings 120.

Specifically, there is shown a pair of high-strength metal housings 120 configured to have a structure to fully surround the outsides of the two battery cells 10. The metal housings 120 restrain the deformation of the battery cells 10 due to repetitive expansion and contraction of the battery cells 10 during charge and discharge of the battery cells 10, while protecting the battery cells 10, the mechanical strength of which is low, to prevent sealed portions of the battery cells 10 from being separated from each other. The metal housings 120 include a left housing 121 and a right housing 122, which may be coupled to each other without using an additional fastening member.

Figure 7:
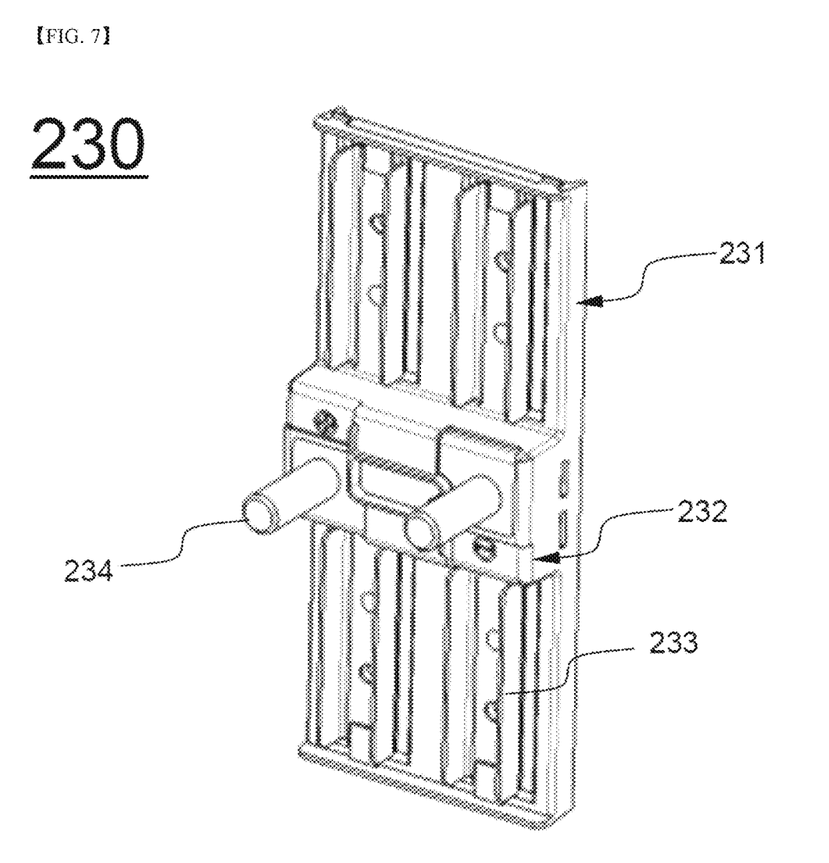
FIG. 7 is a perspective view of a bus bar assembly.
Figure 8:
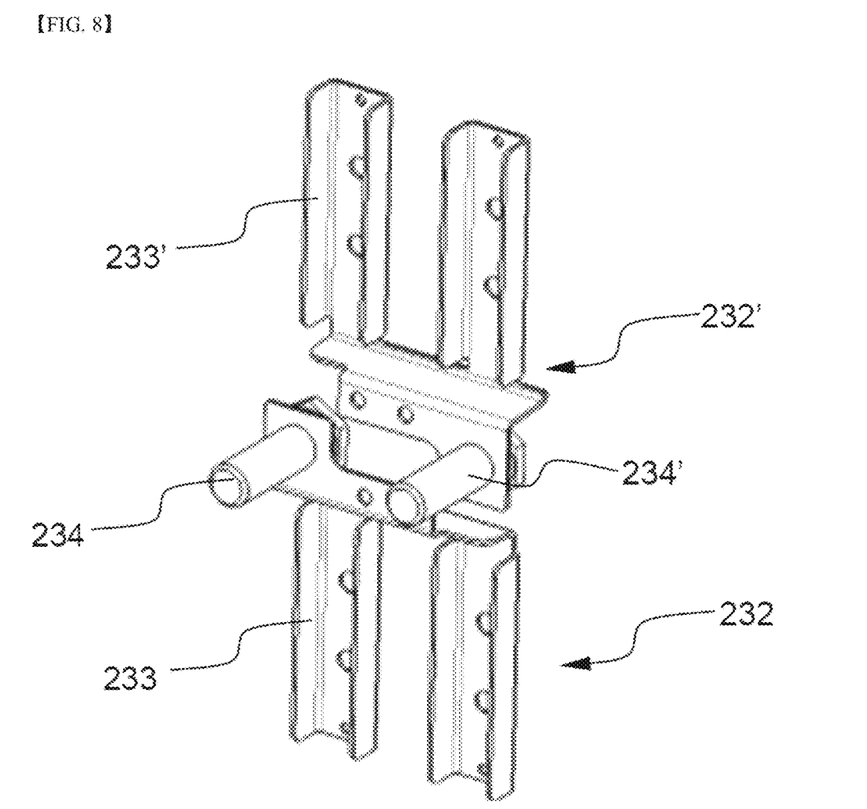
FIG. 8 is a perspective view showing a pair of body parts shown in FIG. 7.

FIG. 7 is a perspective view of a bus bar assembly according to an embodiment of the present invention and FIG. 8 is a perspective view showing a pair of body parts shown in FIG. 7.

Referring to these drawings together with the preceding drawings, the bus bar assembly 230 includes a cover plate 231 and body parts 232.

The cover plate 231 is formed of an electrically insulative material. The cover plate 231 is fixed to the front of the battery modules 200. The cover plate 231 includes a pair of body parts 232. Consequently, the electrode terminals 11 of the cell units 100 are electrically connected to each other via bus bars 233.

Each body part 232 is configured to have a structure in which an external input and output terminal 234 is formed at an L-shaped side thereof and two or more bus bars 233 diverge from the other side thereof in plane in a state in which the body parts 232 are coupled to the cover plate 231 by insert injection molding.

The body parts 232 and 232' are arranged so as to face each other in the direction (direction A of FIG. 3) horizontal to the direction in which the battery modules 200 are arranged.

The body parts 232 are provided with steps to prevent a short circuit between the external input and output terminals 234 and 234'. Consequently, the positions of the external input and output terminals 234 and 234' may be set based on the steps.

Figure 9:
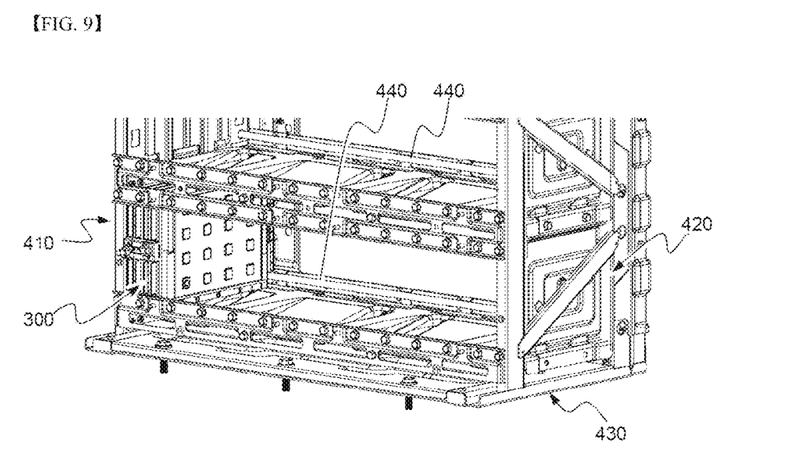
FIGS. 9 and 10 is a perspective view showing a battery pack according to the present invention.
Figure 10:
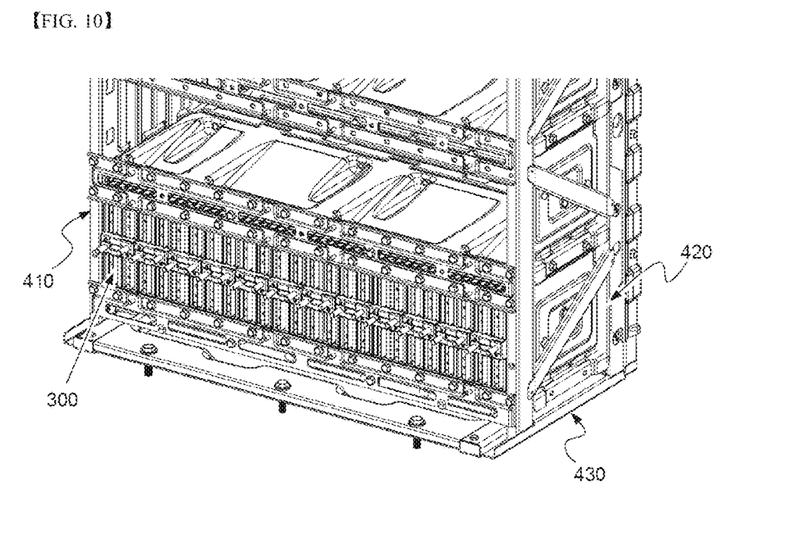

FIGS. 9 and 10 is a perspective view showing a battery pack according to the present invention.

Referring to these drawings together with FIGS. 2 and 4, battery module assemblies 300 are mounted in a battery pack case including a first support member 410, a second support member 420, and a third support member 430. In addition, the battery module assemblies 300 are more stably and securely mounted in the battery pack case through coupling between the rod-shaped fastening members 440 and second fastening holes 240 and 241.

As shown in FIGS. 9 and 10, the battery module assemblies 300 are assembled in the battery pack case to have a shelf structure, such as a rack structure, constitute as battery pack. Consequently, the battery module assemblies 300 are easily fixed and mounted, thereby achieving overall structural stability of the battery pack.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module assembly according to the present invention is configured such that the upper case and the lower case are fixed through the first fastening holes and the battery module assembly is positioned and fixed through the second fastening holes, thereby easily achieving construction of the battery module assembly, and the battery modules are easily positioned and fixed when constituting the battery pack, whereby it is possible to manufacture a battery pack having overall structural stability.

In addition, in the battery module assembly according to the present invention, the cell units are connected in parallel to each other on a per two battery cell basis using the bus bars, thereby improving welding reliability.

The invention claimed is:

1. A battery module assembly, comprising:
   two or more battery modules arranged in a horizontal direction and electrically connected to one another, each battery module comprising one or more battery cells;
   an upper case and a lower case surrounding outer circumferences of the battery modules such that one surface of each of the outermost battery modules is exposed outside, the upper case having a top wall forming a top of the battery module assembly and a front wall extending across the two or more battery modules, the lower case having a bottom wall forming a bottom of the battery module assembly and a front wall extending upwardly from the bottom wall and across the two or more battery modules;

one or more first fastening holes vertically formed in the top wall of the upper case and one or more first fastening holes vertically formed in the bottom wall of the lower case, wherein the one or more first fastening holes in the top wall of the upper case face the one or more first fastening holes in the bottom wall of the lower case;

a second fastening hole horizontally formed at the front wall of the upper case and a second fastening hole horizontally formed at the front wall of the lower case to position or fix the battery module assembly; and a bus bar assembly electrically connected to the battery modules, the bus bar assembly having an external input terminal and an external output terminal extending outwardly from the upper case, the bus bar assembly being between the second fastening hole horizontally formed at the front wall of the upper case and a second fastening hole horizontally formed at the front wall of the lower case, wherein each of the two or more battery modules extends from the bottom wall of the lower case to the top wall of the upper case.

2. The battery module assembly according to claim 1, wherein each of the one or more first fastening holes or the second fastening holes is configured to have a fastening thread.

3. The battery module assembly according to claim 1, further comprising notches depressed from an outside of the upper case and the lower case.

4. The battery module assembly according to claim 3, wherein each of the notches is formed in an arc shape open toward an outside of the upper case or the lower case in vertical section.

5. The battery module assembly according to claim 1, wherein each of the battery modules is configured to have a structure in which cell units, each of which comprises two or more battery cells, are connected in parallel to one another.

6. The battery module assembly according to claim 1, wherein the bus bar assembly comprises:
(a) a cover plate formed of an electrically insulative material, the cover plate being fixed to the front of the battery modules, the cover plate comprising a pair of body parts; and
(b) each of the pair of body parts is configured to have a structure in which the external input and output terminal is formed at an L-shaped side thereof and two or more bus bars diverge from the other side thereof in a state in which the pair of body parts are mounted on the cover plate,
wherein the pair of body parts are arranged so as to face each other in a direction horizontal to a direction in which the battery modules are arranged.

7. The battery module assembly according to claim 1, wherein each of the battery cells is a prismatic secondary battery or a pouch-shaped secondary battery.

8. The battery module assembly according to claim 7, wherein the pouch-shaped battery cell is configured to have a structure in which an electrode assembly of a cathode/separator/anode structure is mounted in a battery case formed of a laminate sheet comprising a resin layer and a metal layer and a cathode terminal and an anode terminal protrude from one end of the battery case.

9. The battery module assembly according to claim 8, wherein insulating tape is attached to an outer circumference of the battery cell excluding electrode terminals of the battery cell.

10. The battery module assembly according to claim 5, wherein each of the cell units is configured to have a structure in which the two or more battery cells are mounted between metal housings in a state in which the two or more battery cells are in tight contact with each other.

11. A battery pack comprising two or more battery module assemblies according to claim 3, wherein
fastening members are coupled within the notches, the battery module assemblies are arranged in tight contact to constitute a battery module assembly stack, and
the battery pack comprises a first support member and a second support member disposed at opposite sides of the battery module assembly stack such that the first support member and the second support member are coupled to the fastening members to fix the battery module assembly stack.

12. The battery pack according to claim 11, wherein the battery pack further comprises a third support member disposed at a bottom of the battery module assembly stack such that the third support member is coupled to the first support member and the second support member.

13. The battery pack according to claim 11, wherein each of the fastening members is formed in a prismatic, circular, or oval bar shape in vertical section in a longitudinal direction.

14. The battery pack according to claim 11, wherein each of the notches is formed in a shape corresponding to an outer shape of each of the fastening members.

15. A device comprising a battery pack according to claim 11.

16. The device according to claim 15, wherein the device is an electric vehicle, a hybrid electric vehicle, a plug-in hybrid electric vehicle, or a power storage device.

17. A battery pack, comprising:
two or more battery modules arranged in a horizontal direction and electrically connected to one another, each battery module comprising one or more battery cells;
an upper case and a lower case surrounding outer circumferences of the battery modules such that one surface of each of the outermost battery modules is exposed outside, the upper case having a top wall, a front wall extending across the two or more battery modules and a rear wall extending across the two or more battery modules, the lower case having a bottom wall, a front wall extending across the two or more battery modules and a rear wall extending across the two or more battery modules;
a first notch in the rear wall of the upper case, the notch extending horizontally across a width of the upper case;
a second notch in the rear wall of the lower case, the notch extending horizontally across a width of the lower case, and
a frame, the frame comprising:
a first side wall and a second side wall spaced from one another in a first direction;
a lower bar extending in the first direction between the first side wall and the second side wall; and
an upper bar extending in the first direction between the first side wall and the second side wall,
wherein the upper bar fits within the first notch and the lower bar fits within the second notch.

18. A battery module assembly, comprising:
two or more battery modules arranged in a horizontal direction and electrically connected to one another, each battery module comprising one or more battery cells;

an upper case and a lower case surrounding outer circumferences of the battery modules such that one surface of each of the outermost battery modules is exposed outside, the upper case having a top wall and a front wall extending downwardly from a front edge of the upper case, the lower case having a bottom wall and a front wall extending upwardly from a front edge of the lower case;

a first horizontal fastening hole formed in the front wall of the upper case and a second horizontal fastening hole formed at the front wall of the lower case to position or fix the battery module assembly; and a bus bar assembly electrically connected to the battery modules, the bus bar having a pair of terminals extending outwardly from the upper case, the bus bar assembly being between the first horizontal fastening hole and second horizontal fastening hole.

19. The battery module assembly according to claim 18, wherein the first horizontal fastening hole and second horizontal fastening hole are threaded.

* * * * *